United States Patent Office 3,204,407
Patented Sept. 7, 1965

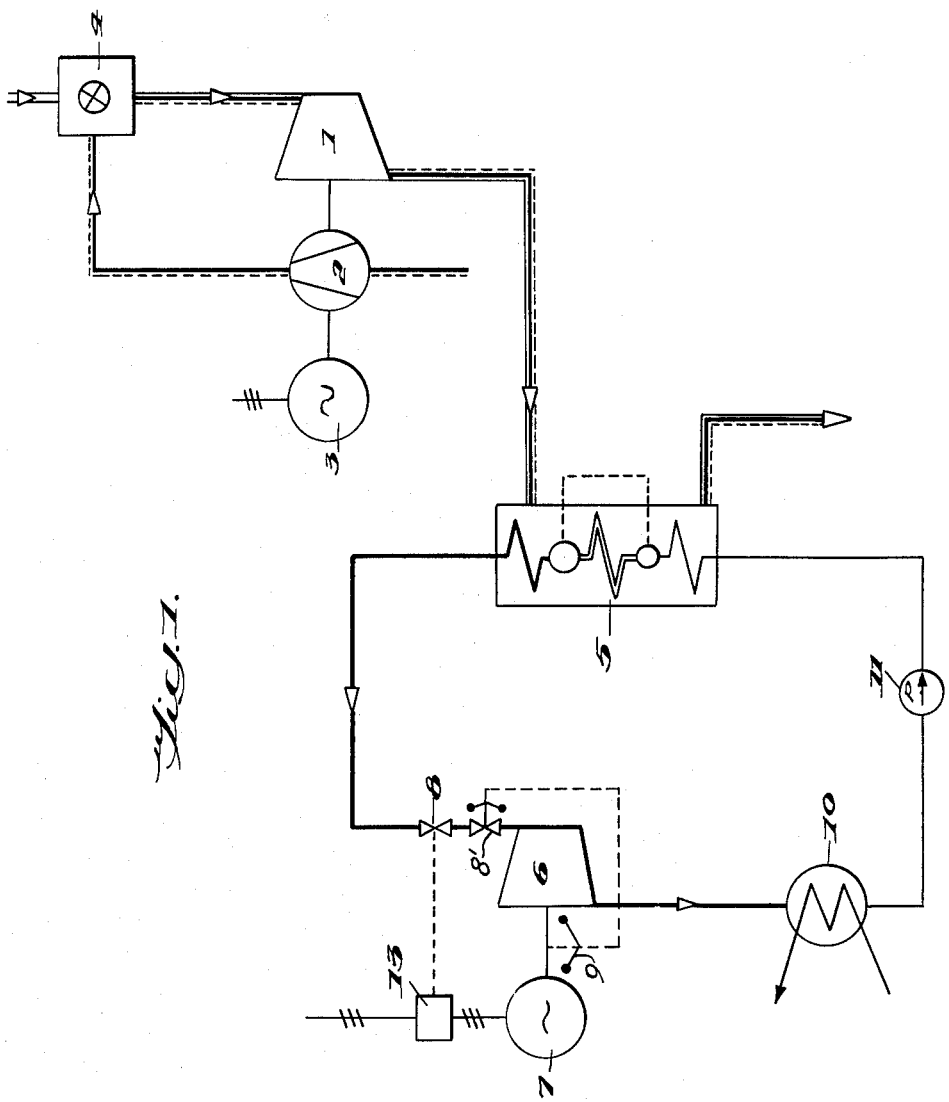

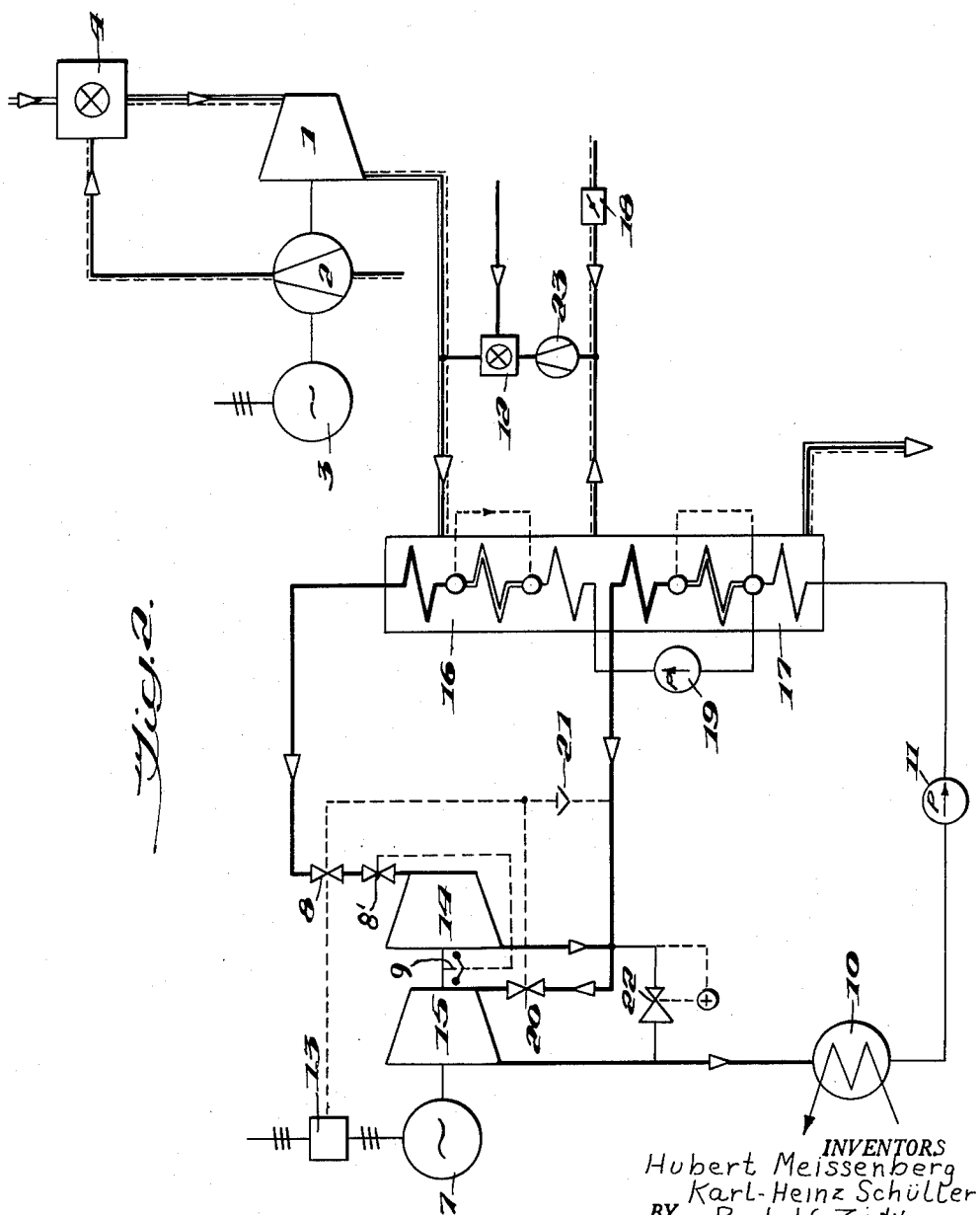

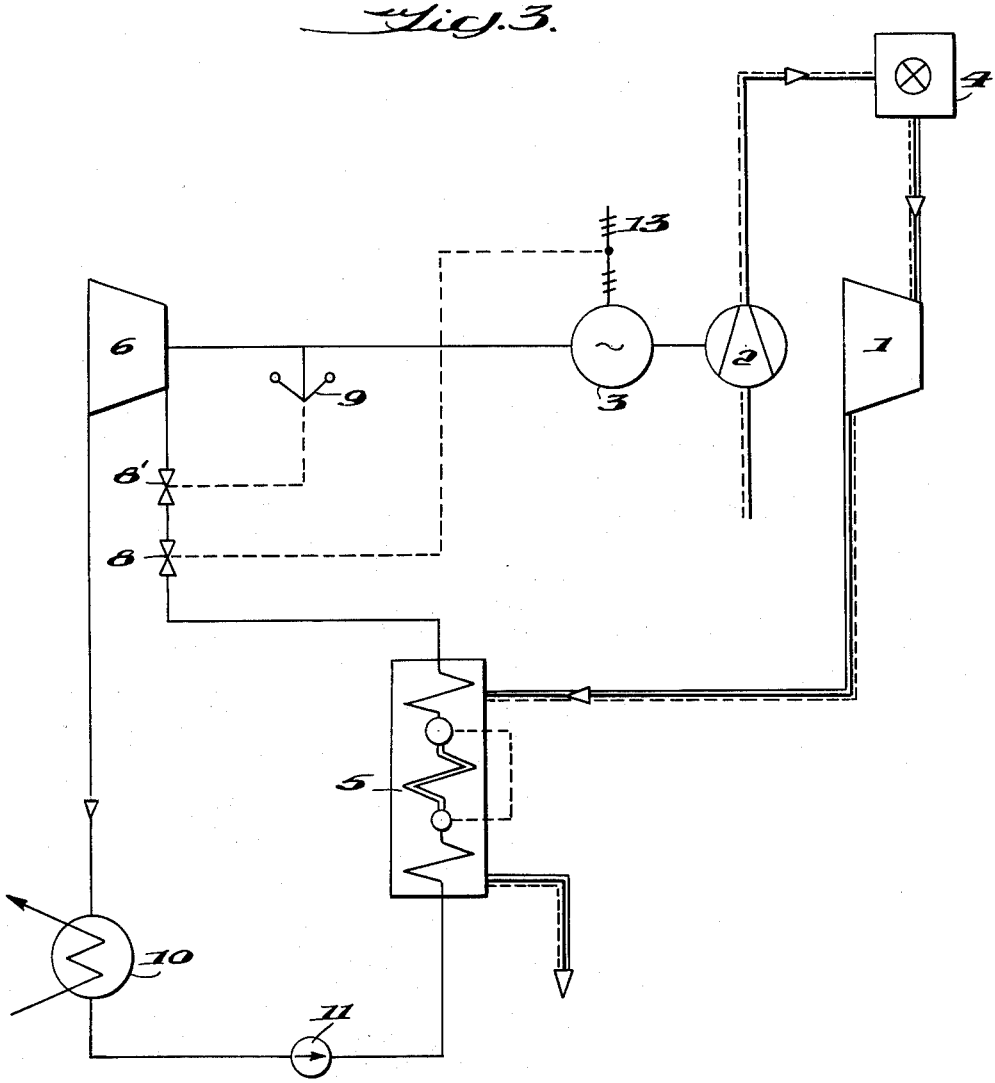

3,204,407
COMBINED GAS TURBINE AND STEAM
TURBINE POWER PLANT
Hubert Meissenberg, Post Rippenweiher, Karl-Heinz Schüller, Mannheim-Freudenh, and Rudolf Zinkl, Munich, Germany, assignors to Brown, Boveri & Cie, Aktiengesellschaft, Mannheim, Germany, a joint-stock company
Filed Mar. 26, 1962, Ser. No. 182,222
Claims priority, application Germany, Mar. 30, 1961, B 61,963
5 Claims. (Cl. 60—39.18)

The invention relates to a combined gas-turbine steampower installation and has for an object to provide an installation of this type which is able to cover strongly varying and stepply climbing load-changes.

Hitherto, for this purpose, there have been used various low-pressure steam-power installations with corresponding storage facilities, this plant, however, being disadvantageous for the following reasons: in order to obtain high storage capacity of the boiler or, respectively of a steam accumulator, the working pressure in the latter must be proportionately low. Furthermore, the live-steam temperature too must be low in order to avoid unallowable temperature demands of the steam-turbine on steep and rapid load changes. These requirements have a very detrimental effect on the thermal efficiency so that generation of peak-outputs in a pure low-pressure steam-process is uneconomic in most cases. Over and above, the installations of this known type require correspondingly high specific capital cost.

To avoid the aforementioned disadvantages, with a combined gas-turbine steam-power installation, especially an installation in block arrangement where a low pressure steam-power installation inserted after a gas-turbine plant is utilized for steam generation in a waste-boiler located after the latter and the steam expanded in a steam-turbine, the arrangement according to the method of the invention is as follows: the units of the combined installation are so sized that the gas-turbine plant, which supplies a substantially constant power output independent of load variations, i.e. an unregulated output, suffices intrinsically to cover the base-load component, while the steam power installation is arranged to cover the additional output required at peak-loads, in connection with which the waste-heat boiler possesses a storage-capacity such that it can absorb the surplus available heat during the load-troughs by increase in temperature and pressure and can cover the additional steam-requirements at times of peak-loads by reducing the pressure; moreover, there is provided a quick-acting control arrangement which regulates the steam flow supplied to the turbine in relation to the changes of the delivered output.

At the same time the object of the invention is not the known combination itself of a gas-turbine plant with a steampower plant but rather a special lay-out of the separate plant components of such a combined installation, with regard to its employment for coverage of strongly varying and steep load-changes.

By means of the pre-insertion of a gas-turbine circuit whose exhaust heat serves completely or only partially to cover the heat requirements of the low-pressure steam process, the thermal efficiency of the latter is substantially improved. Due to the invention an economic working method, with large storage capacity, for the low pressure steam-power installation covering the steep and strongly varying load-changes, is thus obtained. At the same time, the low-pressure steam-power installation can be operated between no-load and maximum-load. Suddenly occurring peak-loads with very steep increase in loading can be absorbed by the gas-turbine installation by reason of its proportionately large rotating mass.

The proportion of the loads for which the gas-turbine plant and the steam-power installation are arranged, conforms to the operation to be expected in the individual cases or, respectively, to the magnitude and duration of the load-changes. For example, it can be suitable for rolling-mill operation, the components of the combined installation being so laid out that the ratio of the output to be delivered by the gas-turbine plant to maximum output of the installation is about 1:3.

The waste-heat boiler can be equipped with its own auxiliary firing, which is so arranged that it can cover the heat requirements of the boiler completely, or in part. At the same time the steam-power installation including waste-heat boiler and auxiliary firing can be peak-load of the complete installation too when necessary, so that also in the case when the gas-turbine plant drops out of service—e.g. when servicing the gas-turbine—the output required to cover the peak-load can be produced.

For further improvement of the thermal efficiency of the combined installation, the low-pressure steam power installation can be arranged as a dual-pressure plant with two or more steam circuits of different pressures. The thermal efficiency and the specific capital-cost of such a combined gas-turbine steam-power installation are comparable to the corresponding values for a pure high-pressure steam power installation. However, while a high-pressure installation is not suited to coverage of large and steep load-changes, such peak-loads can be covered by the installation arranged according to the invention and the required outputs generated with good working security.

Further objects and advantages inherent in the invention will become apparent from the following description of three embodiments thereof and the accompanying drawings:

FIG. 1 is a schematic view of one embodiment of the improved combined gas turbine and steam turbine power plant;

FIG. 2 is a schematic view of a second embodiment of the invention wherein the steam power component of the combined plant is of the dual-pressure type; and FIG. 3 is also a schematic view of a third embodiment wherein the steam and gas turbine components of the combined power plant are arranged on a common power output shaft.

With reference now to FIG. 1, numeral 1 indicates the gas-turbine, 2 the combustion-air compressor, 3 the generator and 4 the combustion-chamber of the gas-turbine plant, to which liquid or gaseous fuel is supplied. A single-shaft gas-turbine plant with open-circuit is shown. The power component delivered by the gas turbine plant is substantially constant, i.e. there is no regulation of fuel supplied to combustion chamber 4 as a function of change in load. The gas-turbine exhaust gas is led into the waste-heat boiler 5 and leaves the boiler system after the greater part of the exhaust-heat has been transferred to the low-pressure steam process. The exhaust steam produced is fed into the condensing turbine 6 and enters the condenser 10 after expansion and performance of work. The turbine condensate is fed again into the waste-heat boiler 5 by means of a condensate pump 11. The electric generator driven by turbine 6 of the steam-power installation is indicated by 7.

With 13 is indicated a quick-acting load-responsive control arrangement of known construction which regulates the quantity of steam fed to the turbine 6, in accordance with the change of output from generator 7, by opening, or respectively closing the steam-inlet valve 8, so that the changes in steam flow are approximately proportional to the changes in output load as measured by apparatus 13. The speed-governor 9 of the steam-power installation which controls another stream inlet valve 8′ in series with valve 8 has thus only a correcting influence.

The gas-turbine delivers, since it produces a constant output, a constant exhaust-heat quantity which is utilized in the waste-heat boiler 5 for steam-generation. At times of low-load-demands from generator 7, the exhaust from the gas-turbine plant serves to raise the temperature and pressure in the boiler system and thus increases the storage of working capacity, while at times of peak-loading the rising steam requirements are covered by a drop in pressure in the boiler.

The components of a combined installation can be so arranged that the steam-power installation serves only to cover the peak-loads while during the load-troughs, the full exhaust-heat of the gas-turbine plant is stored. The distribution can, however, also occur in such a fashion that the stream-power installation also covers a fixed portion of the base-load, or the loading during the load-troughs, and at the same time only the surplus exhaust-heat supply from the gas-turbine plant is used for storage.

From the constant exhaust-heat supply from the gas-turbine plant and the surplus heat-supply during load-troughs or the heat flow storage at these times, the ratio of base-load to peak-load is obtained with which the plant can function, taking into consideration the duration of anticipated peak-loads and the storage-capacity of the waste-heat boiler. At the same time the average heat-supply to the waste-heat boiler should be approximtely equivalent to the average heat-requirements for the steam-production during fluctuating loading of the plant.

In the embodiment according to FIG. 2 a combined installation arranged according to the invention is shown where the steam-power installation is arranged as a dual-pressure plant. Here the same symbols have been used for the components which correspond to those in FIG. 1. Reference numeral 14 indicates the turbine situated in the higher pressure steam circuit and 15 the turbine in the lower pressure steam circuit, while 16 and 17 refer to the corresponding higher and lower pressure components of the waste-heat boiler. 19 is a supplementary feed-water pump situated in the circuit of higher pressure.

The control arrangement 13 acts—as is indicated by the broken lines—both on the steam-inlet valve 8 situated in the steam line ahead of the turbine 14 and on the valve 20 controlling the steam-inlet to turbine 15, and regulates the steam-flow quantities to the turbine in accordance with the load-changes at generator 7. By 21 is indicated an additional back-pressure regulation while 22 represents a safety-valve by means of which steam is blown off the condenser 10 when the steam-pressure becomes excessively high.

With especially high peak-load requirements it can be economic to provide the waste-heat boiler, or a part of the latter, with its own auxiliary-firing. Such an auxiliary-firing, arranged as a burner, is indicated in FIG. 2 by 12 and the ancillary combustion-air compresser by 23. As combustion-air for the auxiliary-burner either fresh air from the environment as indicated by 18 or gas-turbine exhaust-gas from the waste-heat boiler can be drawn in. By adoption of the latter-mentioned measure, the heat losses in the exhaust-gas can be further diminished. The air-content in the gas-turbine exhaust-gas is here in most cases sufficient to guarantee perfect combustion.

The combustion load of the auxiliary-burner can be arranged for a constant value, which is independent of the current loading of the plant. The combustion-load of the auxiliary-burner can also, however, be adjustable so that the ratio of base-load to maximum peak-load which can be covered by the installation, can be altered by the burner-setting and caused to suit the prevailing circumstances.

In conclusion, the invention is not restricted to the embodiments shown and described. Various modifications are possible, especially as regards the method of construction. Thus, for example several waste-heat boilers, instead of one, can be provided. Further, the gas-turbine set and the steam-turbine set can also be arranged on a common shaft as illsutrated in FIG. 3 and with this regulation of the steam-flow to the steam-power plant can depend on the alterations of output from the entire installation.

We claim:
1. Installation for producing power comprising a gas turbine plant having a substantially constant output combined with a steam turbine plant having a variable output; said steam turbine plant comprising a steam turbine and a boiler for producing steam at comparatively low pressure, the steam outlet from said boiler being connected to the inlet to said steam turbine and the outlet from said steam turbine being connected to the water inlet to said boiler via a steam condenser; said gas turbine plant having a substantially constant power output notwithstanding a change in load on the combined power plant and comprising a gas turbine, an air compressor driven by said gas turbine and a combustion chamber, the air compressed in said compressor being fed to said combustion chamber for combustion of fuel supplied to said combustion chamber at a substantially constant rate, and the products of combustion being delivered from said combustion chamber to the inlet of said gas turbine; said gas turbine and steam turbine plants being so dimensioned that said gas turbine plant is able to supply the greater part of the base load of the installation while said steam turbine plant is able to supply the additional output required at steep and rapidly varying peak loads; conduit means delivering the gas exhaust from the outlet from said gas turbine to said boiler for heating the water to produce steam, said boiler having a heat storage capacity such as to absorb and store surplus heat during load troughs by means of temperature and pressure increase and thereby enable it to supply the additional steam requirements at times of peak loads by means of a pressure decrease therein; and a regulating device responsive to the load peak component to be supplied by said steam turbine plant for regulating only the flow of steam from said boiler to said steam turbine in accordance with the change in load.

2. A power installation as defined in claim 1 wherein said steam turbine plant is constituted by high and low pressure turbines and said boiler includes high and low pressure steam sections connected respectively to said high and low pressure steam turbines.

3. A power installation as defined in claim 1 and which further includes an auxiliary firing means for said bolier, said firing means having an output sufficient to furnish at least a part of the heat requirements of said boiler.

4. A power installation as defined in claim 3 and which further includes conduit means delivering the gas exhaust from said gas turbine to said auxiliary firing means to supply combustion air therefor after having been passed through said boiler.

5. A power installation as defined in claim 1 wherein said steam turbine and said gas turbine are arranged on a common power output shaft.

References Cited by the Examiner

UNITED STATES PATENTS

| | | | |
|---|---|---|---|
| 1,978,837 | 10/34 | Forsling | 60—49 |
| 2,603,195 | 7/52 | Permann | 110—49 |
| 2,604,755 | 7/52 | Nordstrom et al. | 60—39.18 |
| 2,605,610 | 8/52 | Hermitte et al. | 60—39.18 |
| 2,911,789 | 11/59 | Baker | 60—39.18 |

FOREIGN PATENTS

| | | |
|---|---|---|
| 601,999 | 7/60 | Canada. |
| 415,788 | 9/34 | Great Britain. |
| 738,286 | 10/55 | Great Britain. |
| 173,497 | 2/35 | Switzerland. |

SAMUEL LEVINE, *Primary Examiner.*

ABRAM BLUM, *Examiner.*